(12) United States Patent
Weldon et al.

(10) Patent No.: US 9,473,389 B2
(45) Date of Patent: Oct. 18, 2016

(54) EXCLUDING A DATA FRAME FROM A LINK AGGREGATION GROUP

(71) Applicant: Hewlett-Packard Development Company, L.P., Houston, TX (US)

(72) Inventors: Ryan Lee Weldon, Houston, TX (US); Peter D Rega, Sugar Land, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 522 days.

(21) Appl. No.: 13/906,091

(22) Filed: May 30, 2013

(65) Prior Publication Data

US 2014/0355608 A1    Dec. 4, 2014

(51) Int. Cl.
*H04L 12/28* (2006.01)
*H04L 12/709* (2013.01)
*H04L 12/741* (2013.01)

(52) U.S. Cl.
CPC ............. *H04L 45/245* (2013.01); *H04L 45/74* (2013.01); *Y02B 60/33* (2013.01)

(58) Field of Classification Search
CPC ..... H04L 45/245; H04L 45/22; H04L 45/00; H04L 47/125; H04L 45/38; H04L 49/15
USPC .................................. 370/392, 389, 218, 235
See application file for complete search history.

(56) References Cited

U.S. PATENT DOCUMENTS

| 7,649,846 | B2 | 1/2010 | Nakagawa et al. |
| 8,259,718 | B2 | 9/2012 | Akahane et al. |
| 2006/0227711 | A1* | 10/2006 | Nakagawa et al. ........... 370/235 |
| 2012/0033541 | A1 | 2/2012 | Da Silva et al. |
| 2012/0236859 | A1 | 9/2012 | Subramanian et al. |
| 2012/0275297 | A1 | 11/2012 | Subramanian |
| 2012/0307623 | A1* | 12/2012 | Assarpour ........... H04L 43/0817 370/218 |
| 2013/0287020 | A1* | 10/2013 | York ....................... H04L 49/15 370/389 |

FOREIGN PATENT DOCUMENTS

WO    WO-2012010868    6/2009

OTHER PUBLICATIONS

Configuring Trunk Groups and Dynamic Link Aggregation, (Research Paper), Jun. 10, 2009, 48 pps., http://www.foundrynet.com/services/documentation/sribcg/current/Trunking.html.

* cited by examiner

*Primary Examiner* — Dang Ton
*Assistant Examiner* — Lionel Preval
(74) *Attorney, Agent, or Firm* — Hewlett Packard Enterprise Patent Department (57) ABSTRACT

Examples disclose a computing device, method, and machine-readable storage medium to identify a destination address associated with a data frame upon ingress. Additionally, the computing device, method, and machine-readable storage medium exclude the data frame from a link aggregation group (LAG) based upon a determination to route the data frame to a port associated with the LAG.

14 Claims, 7 Drawing Sheets

EXCLUDING A DATA FRAME FROM A LINK AGGREGATION GROUP

BACKGROUND

Network switches may link various network devices together. These network devices may be connected through a link aggregation group (LAG). The LAG operates to link multiple physical links as an individual link to increase throughput by combining multiple network connections in parallel and to provide redundancy.

BRIEF DESCRIPTION OF THE DRAWINGS

In the accompanying drawings, like numerals refer to like components or blocks. The following detailed description references the drawings, wherein.

DETAILED DESCRIPTION

A link aggregation group (LAG) may route a data frame to an incorrect functionality associated with a network interface controller. Data frame, as described herein, includes a series of bits, bytes, characters, and/or values of data communicated within a network and as such, may include a data packet. The network interface controller may include both network functionality and storage functionality. When these functionalities are combined, it may be difficult to operate these functionalities together. For example, the LAG may route the data frame to the incorrect functionality on the network interface controller, thus the data frame may not reach the correct functionality as the functionalities within the network interface controller operate independently. Further, the data frame may be routed on the incorrect port if routed first to the LAG as the LAG determines which port to transmit the data frame. In these examples, the data frame may potentially be dropped or discarded.

To address these issues, examples disclosed herein provide a method to identify a destination address associated with a data frame upon ingress into a computing device (e.g., networking switch). The method further excludes the data frame from a LAG based upon a determination to route the data frame directly to a port associated with the LAG rather than the LAG. Routing the data frame directly to the port enables the data frame to override the LAG and ensures the data frame to reach the correct destination and functionality. Additionally, routing the data frame to the correct destination further ensures the data frame is not dropped nor discarded.

In another example, examples disclosed herein provide the method to inspect the data frame for a presence of specified content. Based on the presence of the specified content, the method populates an address table with the destination address identified with the data frame. Populating the address table with the identified destination address based on the presence of the specific content within the data frame, ensures the address table is updated on a timely basis. Further, this example enables a networking system to operate efficiently as the data frame may be excluded from the LAG based on the presence of the specified content.

In summary, examples disclosed herein ensure a data frame is routed to a correct destination by excluding the data frame from a link aggregation group (LAG). The data frame is excluded from a LAG by routing the data frame directly to a port associated with the LAG rather than routing the data frame to the LAG.

Figure 1:
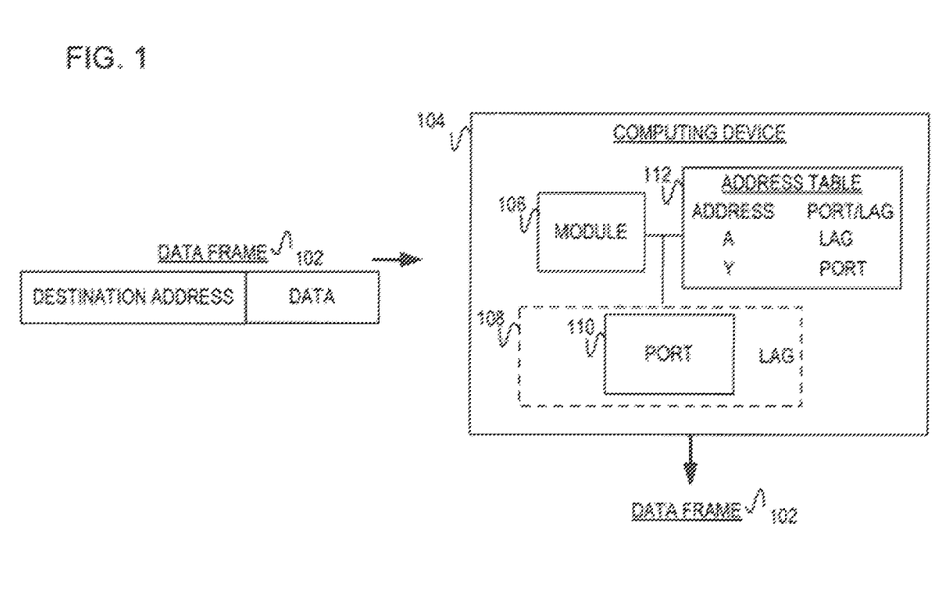
FIG. 1 is a block diagram of an example computing device to receive a data frame associated with a destination address to exclude the data frame from a link aggregation group by routing the data frame to a port.

Referring now to the figures, FIG. 1 is a block diagram of an example computing device 104 including a module 106 to receive a data frame 102 associated with a destination address. The computing device 104 further includes an address table 112 to provide whether to exclude the received data frame from a link aggregation group (LAG) 108 by routing the data frame 102 directly to a port 110. The computing device 104 is a networking device that links network devices together. For example, the computing device 104 may connect a network adapter with a networking switch which routes the data frame 102. Implementations of the computing device 104 include a networking switch, networking device, port network device, multi-layer switch, application-specific integrated circuit (ASIC), controller, processor, chipset, electronic circuit, or other type of networking component capable of routing the data frame 102 to the appropriate destination.

The data frame 102 is a data packet that is a formatted unit of data(s) carried within a computer network. The data frame 102 includes a series of bits, bytes, characters, and/or values of data transmitted amongst the network. The data frame 102 is received by the computing device 104 for identifying the destination address associated with the data frame 102 at module 106. The data frame 102 may include the destination address and other data, such as a data header, data payload, etc. Further, although FIG. 1 illustrates the data frame 102 as including the destination address and data, implementations should not be limited as this was done for illustration purposes. For example, the data frame 102 may include a virtual local area network, data payload, source address, data header, etc.

The module 106 processes the data frame 102 upon ingress at the computing device 104 to route the data frame 102 accordingly. The module 100 processes the data frame 102 to identify the destination address which indicates to the computing device 104 the location of where to route the data frame 102. Implementations of the module 106 include a set of instructions, instruction, process, operation, logic algorithm, technique, logical function, firmware, and or software executable by the computing device 104 for processing the data frame 102 to identify the associated destination address.

The LAG 108 refers to a process of operating a group of physical links as a logical link. In one implementation, the LAG 108 is a trunking group that aggregates multiple physical ports together. Aggregating multiple ports together, the LAG 108 may treat each of the physical links associated with each of the multiple ports 110 as a single port to transmit data frame(s) 102. For example, the LAG may transmit the data frame 102 on one or multiple port(s) 110 based on which port 110 may be available and/or a queue of the data frame 102. Thus, excluding the LAG by routing the data frame 102 directly to the associated port 110 ensures the data frame 102 arrives at the correct destination.

The port 110 serves as a networking interface to transmit the data frame 102. The port 110 is associated as part of the LAG 108 meaning, the LAG 108 may transmit the data frame 102 to the port 110 for transmission to a component external to the computing device 104. The port 110 may receive the data frame 102 directly from the computing device 104 rather than the LAG 108. This implementation excludes the data frame 102 from the LAG 108 by routing the data frame 102 directly to the port. Further, this implementation overrides the LAG 108 by routing the data frame 102 directly to the port 110.

The address table 112 lists the various destination addresses associated with the data frames and corresponding ports and/or LAGS. In this manner, the computing device 104 may reference the address table 112 to determine whether to exclude the data frame 102 from the LAG 108 by routing the data frame 102 directly to the port 110. In an implementation, the address table 112 includes various media access control addresses indicating to which port 110 and/or LAG 108 to route the data frame 102. In another implementation, the address table 112 may include an exclusion table. In a further implementation, the address table 112 may be separated from the exclusion table. These implementations are discussed in detail in the next figure.

Figure 2:
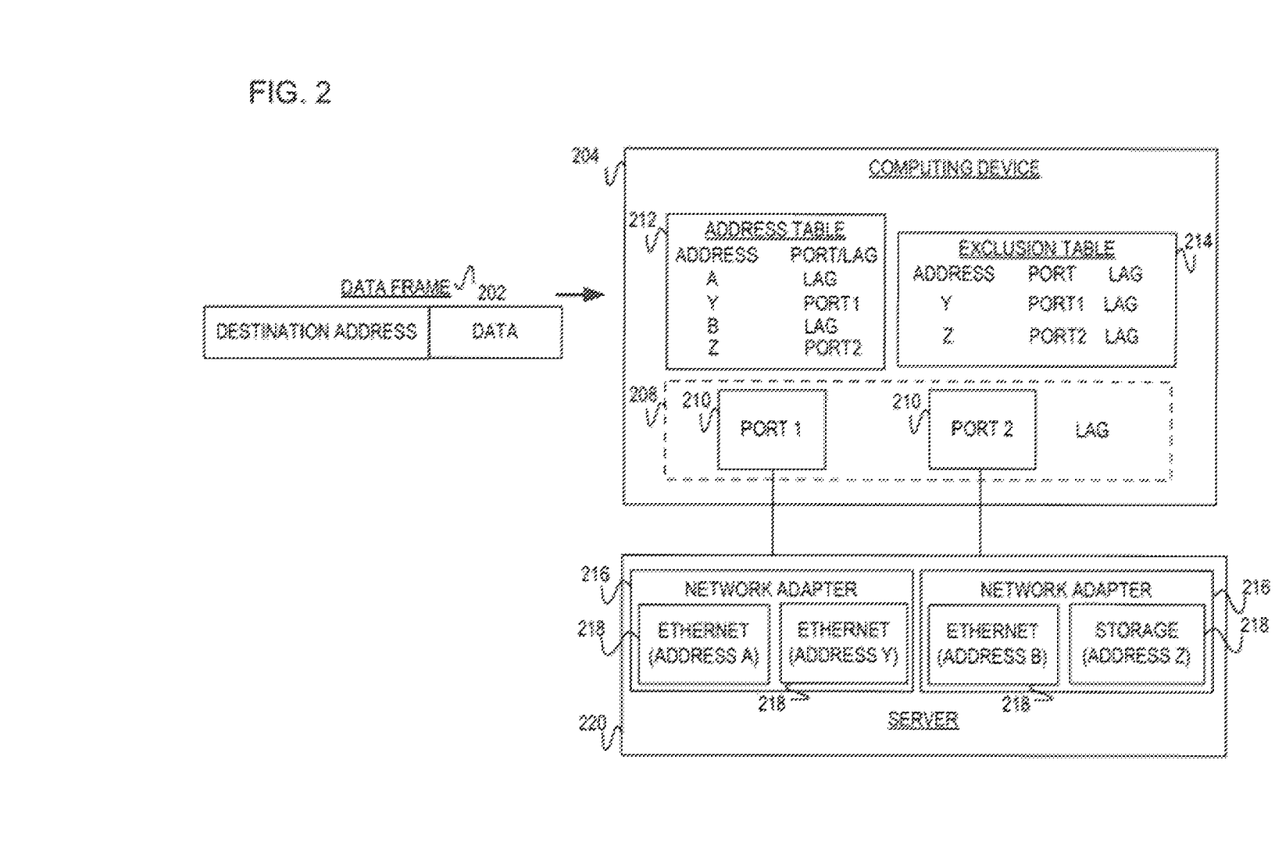
FIG. 2 is a block diagram of an example computing device including an address table and exclusion table to route a received data frame to an identified destination address corresponding to a network adapter.

FIG. 2 is a block diagram of an example computing device 104 including an address table 212 and exclusion table 214. The tables 212 and 214 indicate to the computing device 104 which data frame 202 to exclude from a LAG 208 by routing to an associated port 210 based on an identified destination address. The ports 210 route the data frame 202 to a network functionality 218 (e.g., Ethernet) and/or storage functionality 218 associated with a corresponding network adapter 216. Each of the network adapters 216 are part of a server 220. The data frame 202 is associated with the destination address and data, the data frame 202 is received by the computing device 204. The computing device 204 processes the data frame 202 to identify the destination address. The data frame 202 and the computing device 204 may be similar in structure and functionality to the data frame 102 and the computing device 104 as in FIG. 1.

The address table 212 includes various destination addresses and the corresponding port or LAG. As illustrated in table 212, the various destination addresses (A, Y, B, Z) correspond to either the port 210 or LAG 208 accordingly. For example the destination addresses include, "A," and "B," correspond to "LAG;" "Y," corresponds to "PORT1;" and "Z," corresponds to "PORT2." The address table 212 is referenced by the computing device 204 to determine whether to exclude the data frame 202 from the LAG by routing directly to one of the ports 212 (PORT1 and PORT2). The computing device 204 references the address table 212 for the destination address (A, Y, B, Z) to determine whether to exclude the data frame 202 from the LAG. For example, destination addresses, "Y," are excluded from the LAG as the address table 212 references the corresponding port (PORT1 and PORT2 rather than the LAG. The address table 212 may be similar in structure and functionality to the address table 112 as in FIG. 1.

The exclusion table 214 is used to create rules that provide to the computing device 204 which destination addresses should be excluded from which LAG 208. The rules are used to provide to the computing device 204 which data frames associated with the destination addresses may be routed directly to one of the ports 210. The exclusion table 214 creates the rule of which destination addresses to exclude from which LAG through the following implementations: an administrator manually entering destination address; the computing device 204 inspecting the data frame for specified content; and the computing device 204 determining the capabilities 218 of the network adapter 216. These implementations are discussed in detail in the following figures. Although FIG. 2 illustrates the exclusion table 214 as separate from the address table 212, this was done for illustration purposes. For example, the exclusion table 214 may also be included as part of the address table 212.

The LAG 208 is associated with the various ports 210 for transmitting the data frame 202. As discussed earlier, the LAG 208 may receive the data frame 202 and determine which associated port 210 to utilize for transmission. The LAG 208 may be bypassed or overrode when the computing device 204 references the address table 212 and/or the exclusion table 214 and identifies the destination address. Identifying the destination address on the table(s) 212 and/or 214 enables the computing device 204 to route the data frame 202 directly to one of the ports 210 for transmission. The LAG 208 may be similar in functionality to the LAG 108 as in FIG. 1.

The ports 210 transmit to the network adapters 216 data frame(s) 202. The ports 210 are associated with the destination addresses as listed in the tables 212 and 214. In this implementation, the computing device 204 references these tables 212 and 214 to determine whether to override the LAG 208 and route directly to one of the ports 210. The ports 210. The ports 210 may be similar in structure and functionality to the port 110 as in FIG. 1.

The network adapters 216 are network interface controllers that connect to the computing device 204. Each network adapter 216 may include functional capabilities 218 of network access (e.g., Ethernet) and storage to provide redundancy and additional bandwidth. When at least two of these functional capabilities come together corresponding to each of the ports 210 in the network adapter, it may be difficult to operate these capabilities together. For example, if the data frame 202 is routed to the LAG 208, the LAG may route the data frame 202 to the incorrect functional capability 218. The LAG 208 may determine which one of the ports 210 to transmit the data frame 202, thus the data frame 202 may not reach the correct functional capability 218 as these functional capabilities 208 operate independently. The data frame 202 may potentially be dropped or discarded if transmitted to the incorrect destination and/or incorrect functional capability 218. Enabling the data frame 202 to override the LAG 208, ensures the data frame 202 reaches the correct functional capability 218. Further, excluding the data frame 202 from the LAG 208 ensures the data frame 202 reaches the desired destination address.

The network adapters 216 each include a combination of functional capabilities including network and storage functionalities. Each of these functionalities 218 are associated with a unique identifier so the computing device 204 may route the data frame 202 to the correct functionality 218. Implementations of the network functionality include Ethernet, local area network (LAN), Internet, Intranet, or other type of networking functionality. Implementations of the storage functionality include internet small computer system interface (iSCSI), fiber channel over Ethernet (FCoE), or other type of storage.

The server 220 includes the networking adapters 216 for transmitting and receiving data frames 202 across a network. Implementations of the server 220 include a computing device, networking device, or other type of electronic device capable of including network adapters 216.

Figure 3:
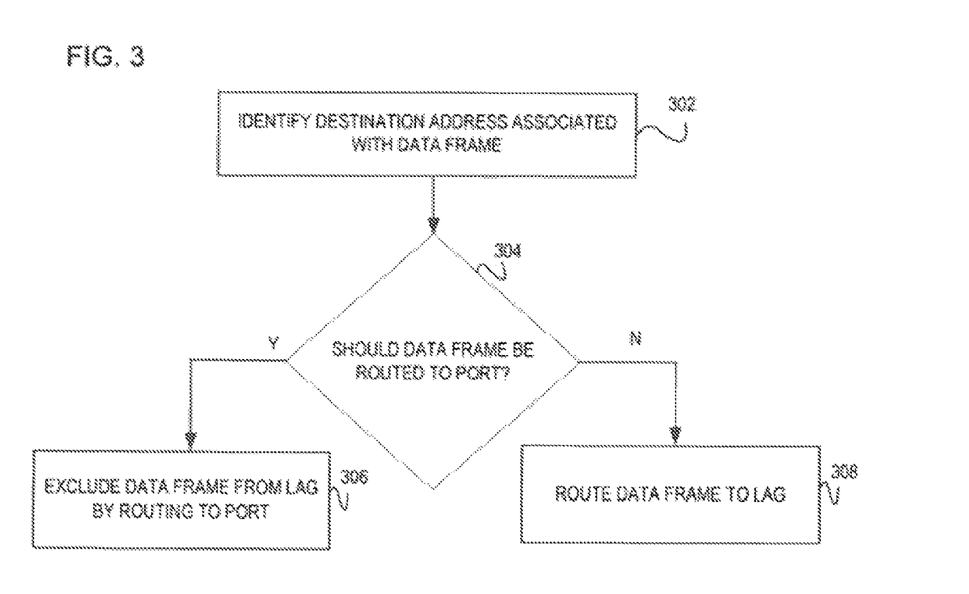
FIG. 3 is a flowchart of an example method to identity a destination address associated with a data frame and determine whether to exclude the data frame from a link aggregation group by routing to a port.

FIG. 3 is a flowchart of an example method to identify a destination address associated with a data frame and determine whether to exclude the data frame from a link aggregation group by routing to a port. Excluding the data frame from the link aggregation group associated with the port ensures the data frame is routed to the appropriate function. In discussing FIG. 3, references may be made to the components in FIGS. 1-2 to provide contextual examples. Further, although FIG. 3 is described as implemented by a computing device 104 as in FIG. 1, it may be executed on other suitable components. For example, FIG. 3 may be implemented in the form of executable instructions on a machine readable storage medium, such as machine-readable storage medium 704 as in FIG. 7.

At operation 302, the computing device receives the data frame and identifies the destination address associated with the data frame. The data frame, upon ingress into the computing device, may be inspected to identify the associated destination address. In one implementation, the computing device includes a networking switch that receives the data frame. The data frame may include a data header, data payload, address location, etc.

At operation 304, the computing device determines whether the data frame should be routed to the port based on the identified destination address at operation 302. The computing device may utilize an address table and/or switching table with multiple destination addresses to determine whether the identified destination address is included in the table. In one implementation, operation 302 determines whether the given data frame may be excluded from a specific link aggregation group. In this implementation, the computing device determines the given data frame should be routed to the port based on given criteria of the data frame. For example, the data frame may include a particular type of data that may have a higher priority when routing to the link aggregation group, thus to avoid delay, the computing device may identify that particular type of data and route to the port. In this implementation, the computing device determines to route the data frame directly to the port rather than the LAG and proceeds to operation 306. In another implementation, the computing device may determine not to exclude the data frame from the LAG and proceed to operation 308.

At operation 306, the computing device routes the data frame directly to the port for transmission. By routing the data frame directly to the port, the computing device excludes routing the data frame to the LAG. In one implementation, the LAG may include multiple ports so when the LAG receives the data frame, an electronic component associated with the LAG may determine which port to transmit the data frame. Operation 306 may bypass the process of the LAG to determine which port to transmit the data frame and transmits the data frame directly to the port associated with the data frame rather than the LAG.

At operation 308, the computing device routes the data frame to the LAG rather than directly to the port. At operation 308, the computing device may determine to not exclude the data frame from the LAG at operation 304 and thus route the data frame to the LAG. Operation 308 includes determining which port operating as part of the LAG for which to utilize for transmitting the data frame.

Figure 4:
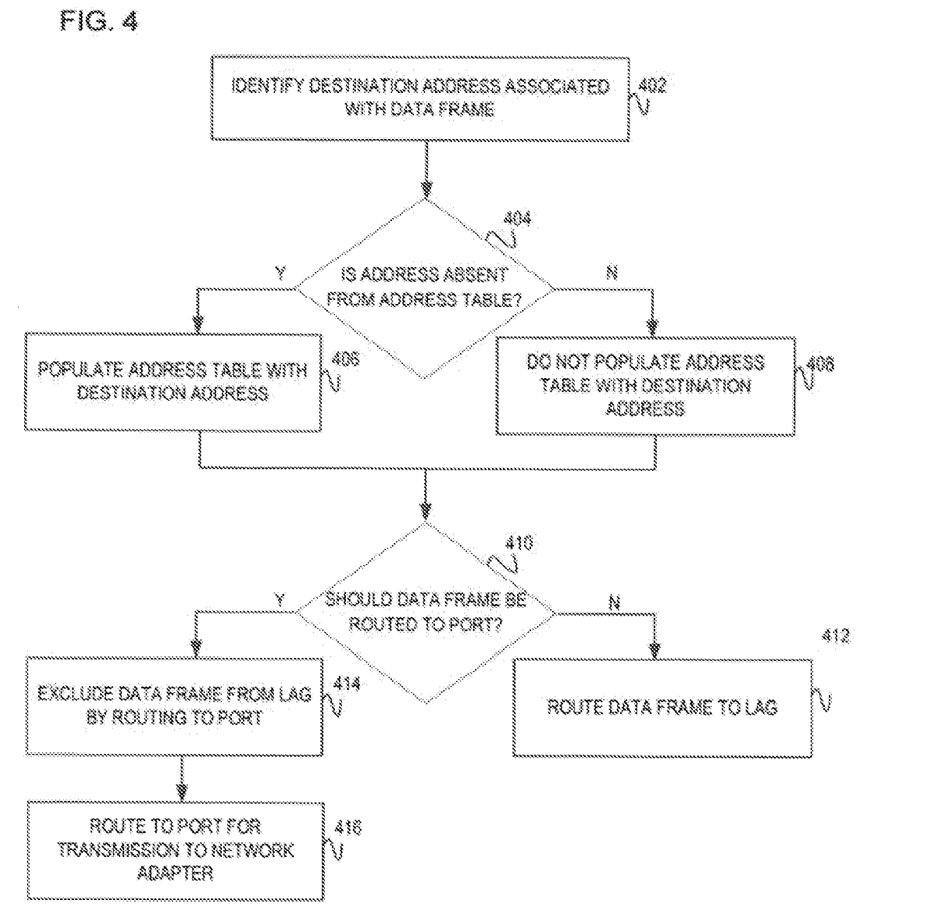
FIG. 4 is a flowchart of an example method to identify a destination address associated with a data frame to determine whether the destination address is absent from an address table and route the data frame accordingly.

FIG. 4 is a flowchart of an example method to identify a destination address associated with a data frame to determine whether the destination address is absent from an address table and route the data frame accordingly. The address table may be populated with the destination address upon ingress of the data frame enables an administrator to exclude particular data from the LAG by creating a rule. In this implementation, when the data frame is inspected based upon the destination address and/or other criteria, enables the role to systematically exclude that particular data frame from the LAG. In another implementation, the destination address may be populated with an exclusion table, independent of the address table. The address table is a type of exclusionary rule table for the computing device to reference when identifying the destination address upon ingress of the data frame. Populating the address table with additional destination addresses enables the table to be updated for routing the data frame to the port rather than the LAG. In discussing FIG. 4, references may be made to the components in FIGS. 1-2 to provide contextual examples. Further, although FIG. 4 is described as implemented by a computing device 104 as in FIG. 1, it may be executed on other suitable components. For example, FIG. 4 may be implemented in the form of executable instructions on a machine readable storage medium, such as machine-readable storage medium 704 as in FIG. 7.

At operation 402, the computing device may receive the data frame and identifies the destination address associated with the data frame. In one implementation of FIG. 4, the method begins at operation 402, while in a further implementation, operations 404-408 are performed prior to operation 402. Operation 402 may be similar in functionality to operation 302 as in FIG. 3.

At operation 404, the computing device determines whether the destination address identified at operation 402 is absent from the address table. In one implementation, if the computing device determines the destination address is not within the address table, the destination address is populated as at operation 406. In one implementation, the administrator of the computing device (e.g., switch) may manually enter the destination address (e.g., media access control address) and other necessary rule information to exclude that particular data frame from the LAG. In another implementation, the computing device may inspect the data frame for specified criteria, such as a particular data type, particular header information, etc. Upon identification of the specified criteria based on the inspection of the data frame, the destination address may be added to the table.

At operation 406, the computing device populates the table with the destination address identified at operation 402. The table may include more than one destination address and utilized by the computing device to consult for the identified destination address. Specifically, the table lists which destination address may be connected to which port and as such, may include multiple destination addresses with the corresponding ports and other information, such as a rule type, LAG association, port association, etc. In another implementation, the table includes multiple media access control addresses which are unique identifiers assigned to each network interface for communications on a physical layer of a segment. In this implementation, the media access control address specifies the destination in which to route the particular data frame.

At operation 408, the computing device may determine not to populate the address table with the destination address identified at operation 402. Operation 408 may include inspecting the data frame at operation 404 for criteria specified by an administrator. Based on this inspection, the computing device may determine the data frame should be routed to the LAG and this may not populate the address table with the destination address.

At operation 410-414, the computing device determines whether the data frame should be routed to the port rather than the LAG. Upon determining the data frame should be not excluded, the computing device routes the data frame to the LAG rather than directly to the port as at operation 414. Upon determining the data frame should be routed to the port (i.e., excluded from the LAG), the computing device may then route the data frame to the port for transmission to the network adapter as at operation 416. Operations 410-414 may be similar in functionality to operations 304-308 as in FIG. 3.

At operation 416, the computing device routes the data frame to the port. The port may then route the data frame to the network adapter. In this implementation, the computing device includes a networking switch and the port is a switch port in communication with the network adapter.

Figure 5:
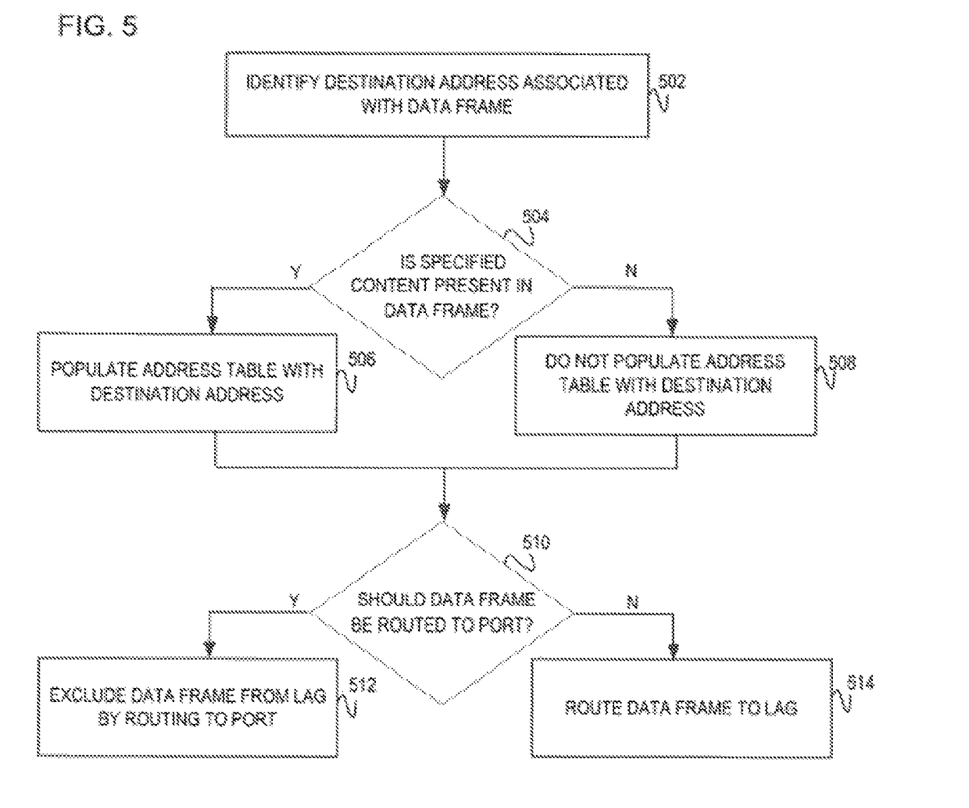
FIG. 5 is a flowchart of an example method to identify a destination address associated with a data frame and determine whether specified content is present within the data frame to populate an address table.

FIG. 5 is a flowchart of an example method to identify a destination address associated with a data frame and determine whether specified content is present within the data frame to populate an address table. The example method in FIG. 5 illustrates a dynamic exclusion of the data frame from a LAG based on a data packet inspection (i.e., data frame inspection). Based on the data frame contents, the data frame may be excluded from the LAG (i.e., overrides the LAG) by routing directly to the associated port. In one implementation, a set of instructions, instruction, process, operation, logic, algorithm, technique, logical function, firmware, and or software executable by a switch operating in conjunction with the computing device inspects the incoming data frame. The computing device (e.g., switch) determines if the data frame meets the specified criteria by processing the contents of the data frame. If the data frame meets the specified criteria, then the data frame is routed directly to the associated port as listed in an address table. In this implementation, the data frame is dynamically excluded from the LAG as the data frame is routed directly to the associated port based on processing the data frame contents. In discussing FIG. 5, references may be made to the components in FIGS. 1-2 to provide contextual examples. Further, although FIG. 5 is described as implemented by a computing device 104 as in FIG. 1, it may be executed on other suitable components. For example, FIG. 5 may be implemented in the form of executable instructions on a machine readable storage medium, such as machine-readable storage medium 704 as in FIG. 7.

At operation 502, the computing device identifies the destination address associated with the data frame. In one implementation of FIG. 5, the method begins at operation 502, while in a further implementation, operations 504-508 are performed prior to operation 502. Operation 502 may be similar in functionality to operation 302 and operation 402 as in FIGS. 3-4.

At operation 504, the computing device inspects the data frame to determine whether the data frame includes specified content. The computing device may process the data frame and segregate the data frame from the LAG based on the presence of the specified criteria within the data frame. The specified criteria includes specific content that may be associated with the data frame upon ingress and as such, implementations of the specified criteria includes a value of a virtual local area network, value of an Ethernet header, address, data header, data payload, source address, a type of data frame, length of data frame, and/or a sequence of the data frame. In another implementation, operation 504 includes packet inspection filters to determine whether to exclude the LAG. If the computing device determines the specified criteria is present within the data frame, the computing device may populate the address table with the identified destination address as at operation 506. If the computing device determines the specified criteria is not present in the data frame, the computing device may then execute operation 506 and does not populate the address table with the identified destination address and proceeds to operation 510.

At operations 506-508, the address table may be populated with the identified destination address as at operation 502. Whether or not the address table is populated with the identified destination address is dependent on whether the specified content is present within the data frame as at operation 504. Operations 506-508 may be similar in functionality to operations 406-408 as in FIG. 4.

At operations 510-514, the computing device may determine the data frame may be excluded from the LAG by routing directly to the associated port. Operations 510-514 may be similar in functionality to operations 304-308 and operations 410-414 as in FIGS. 3-4.

Figure 6:
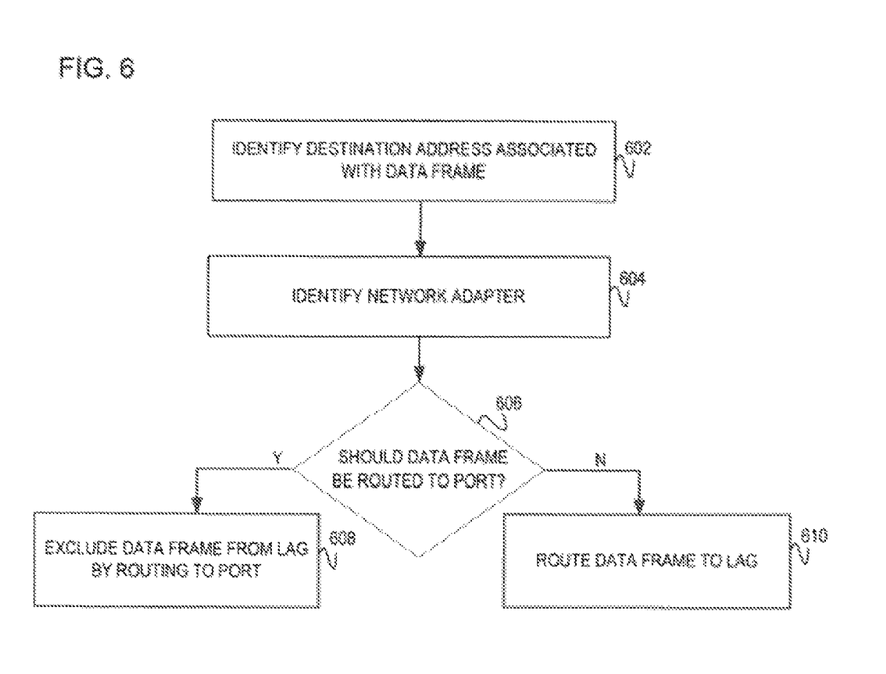
FIG. 6 is a flowchart of an example method to identify a destination address associated with a data frame and identify a network adapter to route the data frame accordingly.

FIG. 6 is a flowchart of an example method to identify a destination address associated with a data frame and identify a network adapter to route the data frame accordingly. The example method of FIG. 6 illustrates a dynamic exclusion of the data frame by discovery of the network adapter associated with a port. The dynamic exclusion in FIG. 6 includes using a communication protocol between the network adapter and the computing device to exchange information, such as identification purposes. Based on this exchange of information of identifying information, the computing device may directly route the data frame to the port or route the frame to the LAG. For example, the network adapter may exchange information with the computing device using link layer discovery protocol (LLDP). Using LLDP, the network adapter identifies itself to the computing device and vice versa. Depending on how the network adapter identifies itself and is functionalities or its capabilities to the computing device, the computing device may determine to directly route the data frame to the port corresponding to that network adapter. In discussing FIG. 6, references may be made to the components in FIGS. 1-2 to provide contextual examples. Further, although FIG. 6 is described as implemented by a computing device 104 as in FIG. 1, it may be executed on other suitable components. For example, FIG. 6 may be implemented in the form of executable instructions on a machine readable storage medium, such as machine-readable storage medium 704 as in FIG. 7.

At operation 602, the computing device identifies the destination address associated with the data frame. In one implementation of FIG. 6, the method begins at operation 602, while in a further implementation, operation 604 is performed prior to operation 602. Operation 602 may be similar in functionality to operations 302, 402, and 502 as in FIGS. 3-5.

At operation 604, the network adapter corresponding to the port associated with the data frame is identified. The network adapter establishes communication with the computing device to identify itself and its functional capabilities to the computing device. Based on the identification of the network adapter, the computing device may determine to route the data frame to directly to the port (i.e., override the LAG) or whether to route the data frame to the LAG. For example, the network adapter may identify itself as internet small computer system interface (iSCSI), with storage capabilities. Thus if the data frame may need to be transmitted on other networks, the ISCSI may not have these Ethernet capabilities, and the computing device may route the data frame to the port with a non-association to that particular network adapter.

At operation 606-610, the computing device determines whether the data frame should be excluded from the LAG by routing the data frame directly to the port. The computing device determines whether to exclude the data frame from the LAG based on the identified network adapter at operation 604 which transmits communications through the port associated with the data frame. Operations 606-610 may be similar in functionality to operations 304-308, 410-414, and 510-514 as in FIGS. 3-5.

Figure 7:
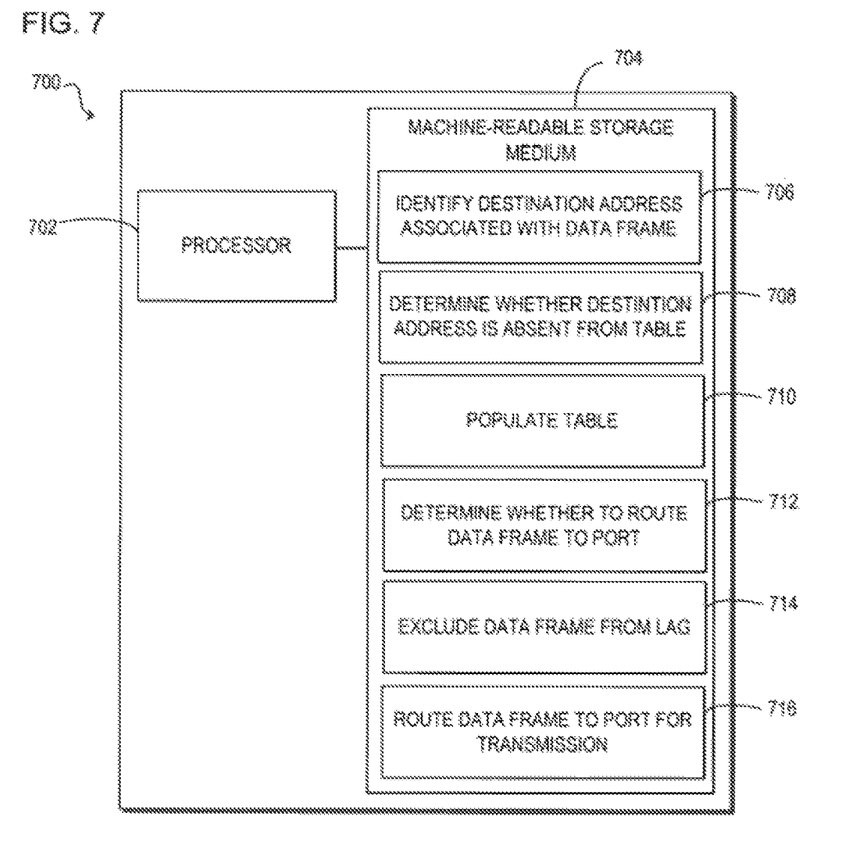
FIG. 7 is a block diagram of an example computing device with a processor to execute instructions in a machine-readable storage medium for identifying a destination address associated with a data frame and to populate the data table with the identified destination address to route the data frame to a port rather than a link aggregation group for transmission.

FIG. 7 is a block diagram of computing device 700 with a processor 702 to execute instructions 706-716 within a machine-readable storage medium 704. Specifically, the computing device 700 with the processor 702 is to identify a destination address associated with a data frame and to populate an address table with the identified destination address to route the data frame to a port. Although the computing device 700 includes processor 702 and machine-readable storage medium 704, it may also include other components that would be suitable to one skilled in the art. For example, the computing device 700 may include the port 110 and/or link aggregation group (LAG) 108 as in FIG. 1. The computing device 700 is an electronic device with the processor 702 capable of executing instructions 706-716, and as such implementations of the computing device 700 may include a computing device, mobile device, client device, personal computer, desktop computer, laptop, tablet, video game console, or other type of electronic device capable of executing instructions 706-716. The instructions 706-716 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory.

The processor 702 may fetch, decode, and execute instructions 706-716 to identify the destination address associated with the data frame and route the data frame accordingly. In one implementation, once executing instruction 706, the processor 702 may then execute instructions 712-716. In another implementation, once executing instructions 706, the processor 702 may then execute instructions 708-710. Specifically, the processor 702 executes instructions 706-710 to: identify the destination address associated with the data frame upon ingress; then determine whether the identified destination address is absent from an address table; and if the destination address is absent from the address table, the address table is populated with the identified destination address. The processor may then execute instructions 712-716 to: determine whether to route the data frame to port; upon the determination to route to the port rather than a link aggregation group (LAG); exclude the data frame from the LAG; and route the data frame to the port for transmission on the port rather than the LAG.

The machine-readable storage medium 704 includes instructions 706-716 for the processor to fetch, decode, and execute. In another embodiment, the machine-readable storage medium 704 may be an electronic, magnetic, optical, memory, storage, flash-drive, or other physical device that contains or stores executable instructions. Thus, the machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 704 may include an application and/or firmware which can be utilized independently and/or in conjunction with the processor 702 to fetch, decode, and/or execute instructions of the machine-readable storage medium 704. The application and/or firmware may be stored on the machine-readable storage medium 704 and/or stored on another location of the computing device 700.

In summary, examples disclosed herein provide ensure a data frame is routed to a correct destination by excluding the data frame from a link aggregation group (LAG). The data frame is excluded from a LAG by routing the data frame directly to a port associated with the LAG rather than routing the data frame to the LAG.

We claim:

1. A computing device comprising:
    a module to:
        identify a destination address associated with a data frame upon ingress of the data frame into the computing device; and
        based on the identified destination address, perform a determination to route the data frame directly to a port such that the determination bypasses routing the data frame to a link aggregation group (LAG) associated with the port; and
    an address table to list based on the identified destination address which data frames should bypass the LAG and be routed directly to the port and which data frames should be routed to the LAG associated with the port, and
    an exclusion table to list which destination addresses should bypass which link aggregation group (LAG).

2. The computing device of claim 1 further comprising: the port to: participate in the link aggregation group (LAG) with multiple ports; and transmit the data frame to the destination address.

3. A method comprising:
    identifying a destination address associated with a data frame upon ingress;
    performing a determination, from an address table, that the data frame should bypass a link aggregation group (LAG) and be routed directly to a port; and
    inspecting the data frame for a presence of specified content; and
    based on the presence of the specified content, populating an exclusion table with the identified destination address associated with the data frame,
    wherein the exclusion table is used in conjunction with the address table to perform the determination; and
    in response to the determination, bypassing the LAG via routing the data frame directly to the port.

4. The method of claim 3 wherein bypassing the LAG via routing the data frame directly to the port is further comprising:

routing the data frame directly to the port for transmission to a network adapter, wherein the port is a participant in the LAG.

5. The method of claim 3 further comprising: determining whether the identified destination address is absent from an the address table; and in response to the determination the identified destination address is absent from the address table, populating the address table with the destination address.

6. The method of claim 3 further comprising: identifying a network adapter through which to route the data frame; and wherein the determination to bypass the data frame from the link aggregation group (LAG) is further based upon the identity of the network adapter.

7. The method of claim 3 further comprising: routing the data frame directly to the port associated with the link aggregation group (LAG) in a manner that bypasses the LAG.

8. The method of claim 3 wherein performing the determination, from the address table, that the data frame should bypass the LAG and be routed directly to the port is further comprising:

processing the identified destination address associated with the data frame in accordance with the exclusion table, wherein the exclusion table specifies which destination address should be excluded from which LAG.

9. A non-transitory machine-readable storage medium encoded with instructions executable by a processor of a computing device, the storage medium comprising instructions to:

identify a destination address associated with a data frame upon ingress;

based on the identified destination address, perform a determination from an address table to bypass a link aggregation group (LAG) and route the data frame directly to a port;

populate an exclusion table with a particular destination address and corresponding port, wherein the exclusion table bypasses the particular destination address from the link aggregation group (LAG); and in response to the determination, route the data frame directly to the port and bypass the LAG based on routing the data frame directly to the port.

10. The non-transitory machine-readable storage medium including the instructions of claim 9 and further comprising instructions to: route the data frame to the port for transmission to a network adapter.

11. The non-transitory machine-readable storage medium including the instructions of claim 9 and further comprising instructions to:

determine whether the destination address is absent from the address table; and populate the address table with the destination address based on the determination the destination address is absent from the address table.

12. The computing device of claim 1 wherein to determine whether to route the data frame directly to the port, the computing device is to: reference the exclusion table; route the data frame directly to the port and bypass the LAG based on a determination the exclusion table includes the identified destination address.

13. The computing device of claim 1 wherein upon the determination to not bypass the LAG, the computing device is to: route the data frame to the link aggregation group (LAG).

14. The computing device of claim 1 wherein the address table includes a list of destination addresses and a corresponding list paths directing the computing device to transmit the data frame to either the LAG or to the port.

* * * * *